United States Patent [19] [11] Patent Number: 5,761,288
Pinard et al. [45] Date of Patent: Jun. 2, 1998

[54] SERVICE CONTEXT SENSITIVE FEATURES AND APPLICATIONS

[75] Inventors: Deborah L. Pinard, Kanata; Thomas A. Gray, Carp, both of Canada

[73] Assignee: Mitel Corporation, Kanata, Canada

[21] Appl. No.: 461,451

[22] Filed: Jun. 5, 1995

[51] Int. Cl.$^6$ ................................................. H04M 3/42
[52] U.S. Cl. .................... 379/201; 379/211; 379/212; 379/265; 379/309
[58] Field of Search .................... 379/242, 243, 379/244, 245, 201, 211, 212, 216, 202, 265, 266, 309

[56] References Cited

U.S. PATENT DOCUMENTS

| | | | |
|---|---|---|---|
| 5,299,260 | 3/1994 | Shaio | 379/265 |
| 5,323,452 | 6/1994 | Dickman et al. | 379/207 |
| 5,329,578 | 7/1994 | Brennan et al. | 379/201 |
| 5,335,269 | 8/1994 | Steinlicht | 379/265 |
| 5,355,404 | 10/1994 | LeDuc et al. | 379/201 |
| 5,425,097 | 6/1995 | Pula | 379/201 |
| 5,434,906 | 7/1995 | Robinson et al. | 379/212 |
| 5,450,480 | 9/1995 | Man et al. | 379/201 |
| 5,455,853 | 10/1995 | Cebulka et al. | 379/201 |
| 5,461,666 | 10/1995 | McMahan et al. | 379/201 |
| 5,479,491 | 12/1995 | Herrero Garcia et al. | 379/212 |
| 5,485,511 | 1/1996 | Iglehart et al. | 379/201 |
| 5,509,060 | 4/1996 | Hall et al. | 379/201 |
| 5,517,562 | 5/1996 | McConnell | 379/201 |
| 5,528,677 | 6/1996 | Butler et al. | 379/201 |
| 5,541,983 | 7/1996 | Rose | 379/201 |
| 5,541,986 | 7/1996 | Hou | 379/201 |
| 5,548,636 | 8/1996 | Bannister et al. | 379/211 |

Primary Examiner—Krista M. Zele
Assistant Examiner—Scott Wolinsky
Attorney, Agent, or Firm—E. E. Pascal

[57] ABSTRACT

A method of providing communication service to a plurality of subscribers comprised of allocating various services to roles to be filled by the subscribers, receiving a trigger for the service to a subscriber in a particular role, and providing different features to a user associated with the service which are restricted to those services which are allocated to the particular role.

12 Claims, 3 Drawing Sheets

SERVICE CONTEXT SENSITIVE FEATURES AND APPLICATIONS

FIELD OF THE INVENTION

This invention relates to the field of communication or control systems, and in particular to a method of providing services to subscribers with services based on roles that the subscribers fill.

BACKGROUND TO THE INVENTION

Communication systems have in the past provided services to subscribers based on services purchased or otherwise allocated to a telephone line (e.g. classes of service). In the most usual case, classes of service are allocated to subscriber lines on the basis of directory numbers wherein there is one directory number per subscriber line. Classes of service have also been allocated to specific subscribers designated by directory number in cases in which the directory numbers are distinct to the subscriber and are separated from strict association with particular singular subscriber lines, for example as described U.S. patent application 08/262,783, filed Jun. 20, 1994, entitled PORTABLE TELEPHONE USER PROFILES, invented by Deborah Pinard et al and assigned to Mitel Corporation. Thus the classes of service are allocated to subscribers who are identified by directory number. Services roam with the subscriber and move to whatever telephone the subscriber is using, once the subscriber has logged into the system. In the latter case, the service data to be accessible by the subscriber is stored in one or more databases which also store a correlation between the directory number and the subscriber line used by the subscriber.

In all of such cases there is only one group of services which is allocated to the subscriber line or to the subscriber.

There are cases in which the subscriber fulfills several roles, and requires different services for each of the roles. For example, a subscriber can act in the role of a supervisor of a company department conducting electronic hardware design, and can also act in the role of an electronic hardware designer. In the former role, the subscriber may need to be able to make long distance calls, but in the latter may be restricted from doing so. In the latter role the subscriber may need to be able to transmit and receive data via telephone line using a high speed modem, but in the latter role need not do so. Similarly, the subscriber may need a high quality subscriber line to receive data when in the role of a designer, and a standard quality line as a supervisor. The subscriber as supervisor may be given executive style voicemail, and no voicemail when acting as a designer.

If all of the services were obtained by the company for each of the employees of the company which might need only one or a few of the services, clearly the cost of equipment and/or service fee for providing the services is higher than the cost would be if only the required services for the role of the subscriber were provided.

SUMMARY OF THE INVENTION

In accordance with the present invention, particular features, restrictions and applications (referred to herein as services) are provided to a subscriber in a corresponding role. In the event the subscriber assumes a different role, the features, restrictions and applications can be different. Thus the system resources needed only for the defined roles in the company can be obtained, minimizing the cost.

It is preferred that the system should be implemented in a communication type system which uses agents, such as is described in U.S. patent application entitled ADAPTIVE COMMUNICATION SYSTEM, Ser. No. 08/257,917, filed on Jun. 10, 1994, and invented by Deborah Pinard et al, which is incorporated herein by reference. That system will be referred to below as the CATA system.

In accordance with a preferred embodiment of the invention, a method of providing a communication service to a plurality of subscribers is comprised of allocating various communication services to roles to be filled by said subscribers, receiving a call to a directory number associated with a subscriber in a particular role, and providing communication services to a telephone set associated with the directory number for the call, which are restricted to those services which are allocated to the particular role.

In accordance with another embodiment, in the method described above, the communication providing services step includes pointing to a service in a list of services stored in a database, the service pointed to depending on which particular role is allocated to the called party, acquiring a basic service list associated with the pointed to service, pointing to a list of allowed features from each basic service task, and completing the call by software programs corresponding to each basic service task with an associated group of allowed features, which correspond to the service pointed to in the list of services.

Preferably the service in the list of services is pointed to by a user agent which receives a trigger goal indicating that a call is to be completed to a particular called subscriber in a particular role. Communication services can be, for example, telephone service, electronic mail, printing, voice mail, facsimile, etc.

In accordance with another embodiment, a method of providing communication service to a plurality of subscribers is comprised of allocating various services to roles to be filled by the subscribers, receiving a trigger for the service to a subscriber in a particular role, and providing different features to a user associated with the service which are restricted to those services which are allocated to the particular role.

In accordance with another embodiment, a method of providing telephone service to a plurality of subscribers is comprised of allocating various telephone services to roles to be filled by the subscribers, receiving a telephone call to a directory number associated with a subscriber in a particular role, and providing telephone services to a telephone set associated with the directory number for the telephone call, which are restricted to those services which are allocated to the particular role.

BRIEF INTRODUCTION TO THE DRAWINGS

A better understanding of the invention will be obtained by reading the description of the invention below, with reference to the following drawings, in which:

FIG. 1 is a block diagram of parts of a system in which the present invention can be implemented, FIG. 2 is a block diagram of a service view used to create services belonging to a role, FIG. 3 is an illustration used in explaining the relationship between roles and services, FIG. 4 is an illustration used to explain an example of the operation of the invention, and FIG. 5 is another illustration used to explain an example of the operation of the invention.

DETAILED DESCRIPTION OF THE INVENTION

Figure 1:
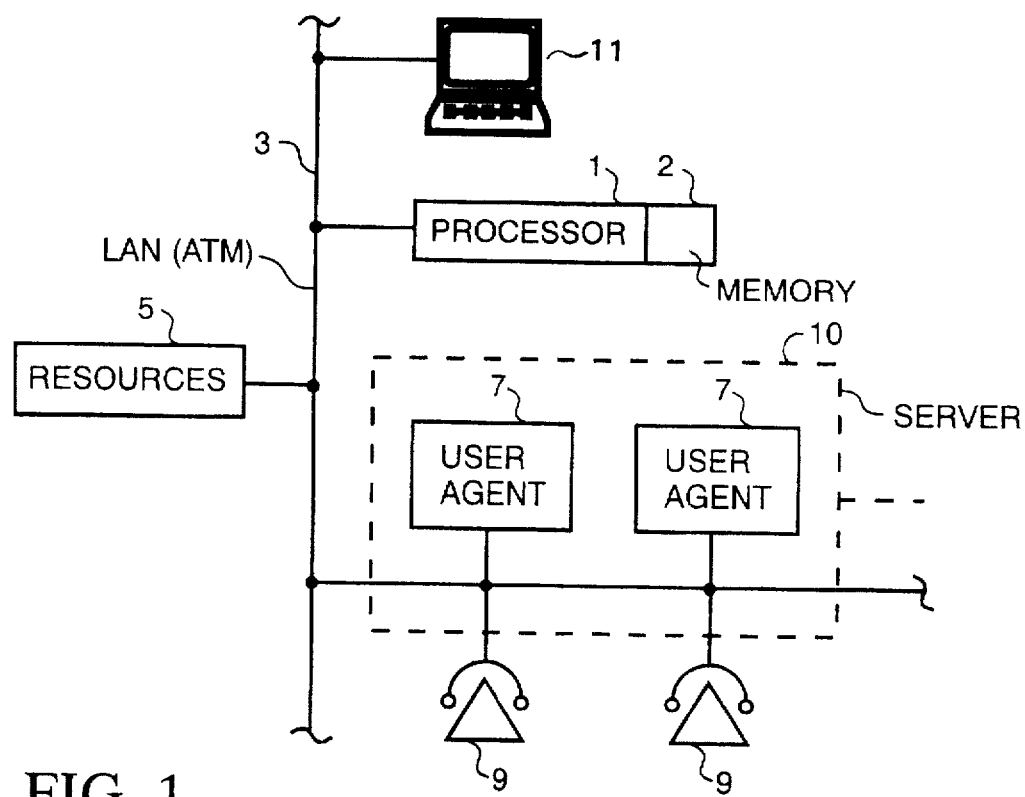

FIG. 1 illustrates a basic summary block diagram of part of a CATA system on which the present invention can be implemented. A main processor 1, which stores various control programs and databases in memory 2, is connected to a local area network ATM (LAN) 3. Various resources 5, such as DTMF receivers, dialers, etc. are connected to the LAN 3. User agents 7, which are programs running on a client or server, are programs running on are connected to the LAN, and to various station apparatus, such as telephone sets 9. The telephone sets can be used in conjunction with various computer or other data terminals (not shown). A terminal 11 is also connected to the LAN, which can be used to input setup data to the system, and which can be stored for example in memory 2.

Alternative to using an ATM LAN, the user agents can be a server 10 which is connected to a non-ATM LAN.

The processor memory 2 stores programs which can provide a user interface on terminal 11 to receive data for storage in a database, in a well known manner. One of the types of data to be input via terminal 11 is a list and locations (addresses) of resources, another is a designation of what services are basic (e.g. unenhanced voice telephone service), another is a list of services to be provided in groups (i.e. service template creation), another is a list of roles that are assumed by employees within the company, and the reporting relationships (the hierarchy), and another is a list of services that can be provided. By a list, it is meant that the database stores not only the title of the service, but also the address in memory 2 of a service software program that can be called by an agent in order to provide the service.

For example, a basic service software program stored in memory 2 can be called by an agent to perform the completion of a voice telephone call from one party to another. An enhanced service software program stored In memory 2 can be called by an agent to connect a high speed modem resource to the LAN and to establish a channel between the telephone set and the modem. Another enhanced service software program stored in memory 2 can be called by an agent to select a stored sequence of digits and to send them to a dialer resource with an instruction to dial them over a telephone line, and to establish a channel between a telephone set and another or to a trunk, following the user agent recognizing that the subscriber has dialed a limited number of speed call digits following the invoking of a speed call. Of course the above is merely illustrative of a small number of services which can be provided in a system.

For example, assume that an employee called Tom is both a software and a hardware designer, and thus has two roles in the company, each of which requires a different group of services to be provided by the system. In addition, roles may be filled for different groups within an enterprise. Each group may have purchased its own resources. Thus the invention provides a way of arbitrating access to authorized resources as well as services.

Figure 2:
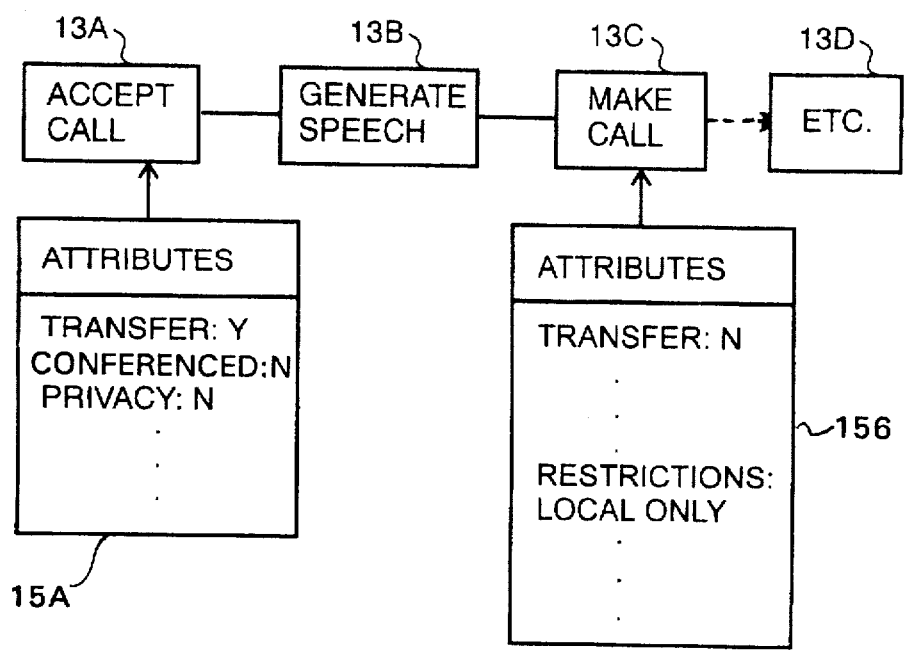

When the database service view is called up on the display of the terminal 11, services are associated with roles which have been defined in the functional view. FIG. 2 illustrates a functional view which is called up for the role of software designer, and which can be used for each software designer in the company. A service is created by linked basic services 13A, 13B, etc. For example, the basic services can be to accept a call, to generate speech, to make a call, etc.

For each of the basic services, various common attributes are listed, with an indication whether they are available to the role or not, for that basic function. For example, for the accept call service 13A, the list of attributes 15A shown are transfer=Y (yes), conference=N (no), privacy=N, etc. For the make call service, the attributes 15B shown are transfer= N, restriction to local calls only, etc. The resources (and their addresses) that are required to perform each of the services are also defined with the services (not shown in FIG. 2).

Thus the attributes assigned to the basic services are particular to the service being created and areas assigned in the service view of the database as noted above, and are stored in memory 2. The resources that can provide each of the services are also defined and their addresses indicated. It should be noted that in the agent form of system, one or more of the resources that can perform particular services can be designated by people, represented by their agents.

Thus, for example, there may be an incoming call to the president of the company, which is defined by an incoming caller designating the company president by dialing a digit in response to an automated attendant. The automated attendant agent, looking up the service list to complete a call to the president, would locate the resource that identifies the president by name, and could announce the incoming caller to the president by name on a loudspeaking telephone. The automated attendant agent could locate the telephone line associated with the president, assuming that the president has logged the telephone line that he is using into the system, or that the system assumes a particular default telephone line that he uses, and provide the services associated with the role of the president to that line.

In the event the president is out of the office, and there is an acting president, the identity of the line used by the acting president, and if desired the identity of the person who is acting president, is stored in the memory 2 upon modification of the service view. In this manner, the services that can be invoked by, or which are extended to, the president, are associated with the line used by the acting president.

Another example of this could be the assignment of "experts" to assist customers calling about problems. The "expert" role could be filled on a rate basis by different people. This rate could assign experts by shift, vacation, coverage, etc.

Figure 3:
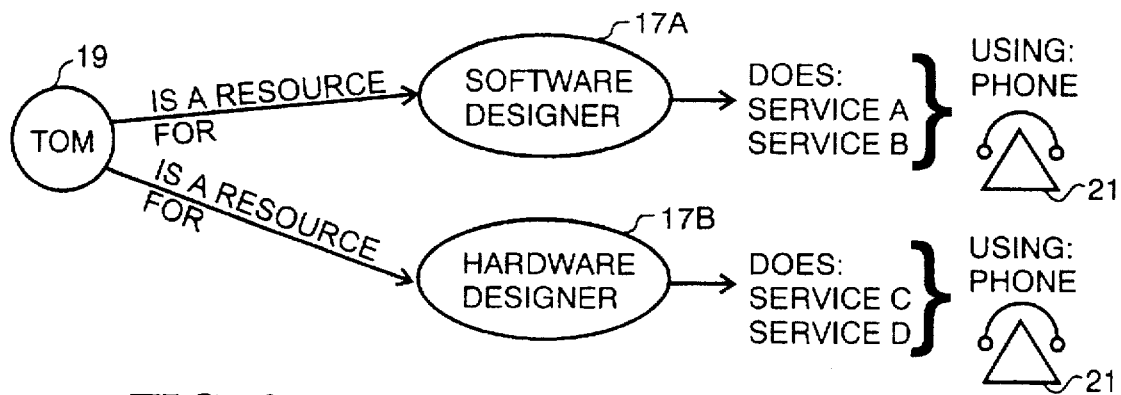

Turning to FIG. 3, two of the roles, software designer 17A and hardware designer 17B are illustrated. The identity of the person Tom 19 is a resource. The identity of Tom is associated with both roles software designer 17A and hardware designer 17B.

Tom, of course, will typically have access to a telephone set 21. Services A and B are associated with the software designer role 17A and services C and D are associated with the hardware designer role 17B.

When a telephone call is received on telephone 21, what Tom can do with the call is dependent on the roll that he is providing at that time. The telephone also takes on the characteristics of the service.

Several techniques can be used to identify whether services A and B or C and D should be used for the call. One technique is to have Tom log into the system that he is assuming a particular role. To do this, he need only lift his telephone 9 handset (FIG. 1, which corresponds to telephone set 21 in FIG. 3), which causes his user agent 7 to be allocated to his call in a manner as described in the aforenoted CATA patent application, and dial a predetermined digit or group of digits prefixed by a command digit such as the # symbol. Of course his telephone set could have dedicated command keys to generate prefix signals.

Alternatively, the system could itself determine from the context of the incoming call which of Tom's roles are to be used. For example, the incoming caller could be connected to an automated attendant resource 5 which requests, using synthesized voice, the keying of a particular key in a voiced keying tree by the calling subscriber which identifies the role.

The incoming call could be a "call by name" call, with an accompanying identifier of Tom's role for that call.

The incoming call could be a request for a particular service that could only be provided by Tom in a particular role. For example, assume that Tom in his role as software designer had stored data or a program in a file that is to be retrieved by a remote calling party. The calling party dials Tom's line by computer terminal to access Tom's computer terminal which is connected to the LAN (not shown, but connected in a manner similar to telephone sets 9).

The signals provided to Tom's user agent from the remote terminal to request connection to Tom's computer terminal allows that agent to identify from the context of the signals that it is Tom in his role as a software designer, rather than as a hardware designer that is desired. In response Tom's user agent causes services A and B to be allocated to the call, rather than services C and D.

Services A and B could be, for example, include a program that communicates with the computer of the calling subscriber asking for a password, and which allows certain resources 5 (such as a modem of a particular speed) which could facilitate access to Tom's computer and downloading of the data or program file to the computer of the calling subscriber.

In this manner, services can be allocated to a role by recognition of the context of the incoming call (or of an outgoing call), and the call controlled thereby.

Another example of the context of the signals of a call causing allocation of services based on the role of the subscriber is as follows. Assume that a software or hardware designer is given the services of up to 10 speed call numbers (0-9), while the company president is given the services of up to 100 (00-99). The user agent can count how many digits are being dialed, and in the event there is only one (following a speed call invoking signal), assign services that have been allocated in the function view during a setup process. In the event two digits are dialed for speed call, the user agent assumes that it is the company president who is dialing, and services that have been allocated for the president are allocated to the call.

Figure 4:
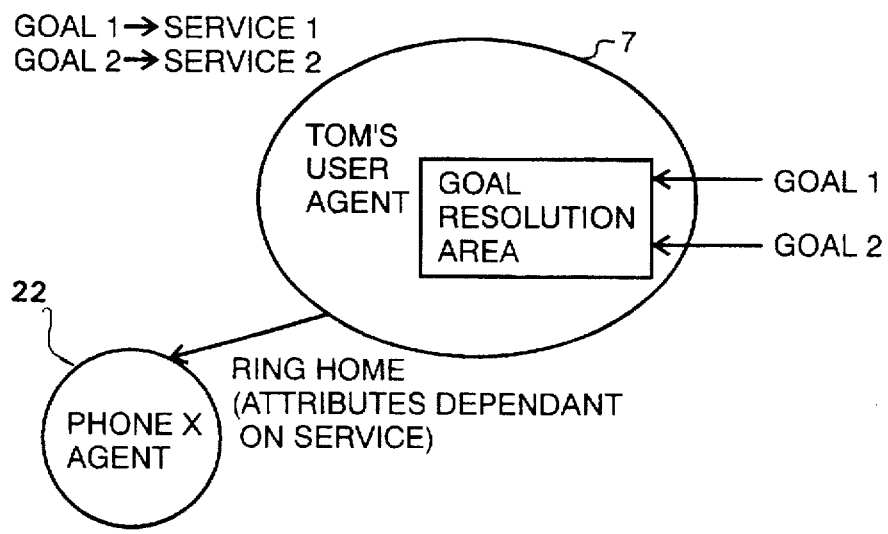

Turning to FIG. 4, assume that an incoming call has been received, designated for Tom. In a manner explained in the aforenoted CATA patent application, the process proceeds to provide a goal to Tom's user agent 7. In accordance with the present invention, the call has been identified as being designated not only for Tom, but Tom in a particular role. Thus all of the services to be allocated to Tom in that role are provided, for example services A and B.

Services A and B are designated by goals 1 and 2, which are communicated from the processor 1 to Tom's user agent 7 in response to the incoming call. These goals are communicated to the goal resolution portion of agent 7, in a bulletin board manner as described in the aforenoted CATA patent application. At the same time, the user agent having identified the goals, obtains the identification of corresponding particular service to be carried out, from the processor 1 memory. From an identification of the service, the attributes stored in the database in memory 2 that were input in the service view described with reference to FIG. 2 are communicated to Tom's user agent 7.

One of the services resulting from one of the goals can be to ring Tom's telephone. Tom's user agent checks the corresponding attributes for that service and determines that there is no ringing restriction on Tom's telephone. Tom's user agent then communicates with the agent 22 of Tom's telephone 21, and sends a message to ring the telephone. The agent of Tom's telephone as a result checks it's database to determine whether Tom's telephone is busy, and if not, calls a ringing signal generator resource 5 to send a ringing signal to Tom's telephone at the address of it's line circuit as connected to LAN 3.

Figure 5:
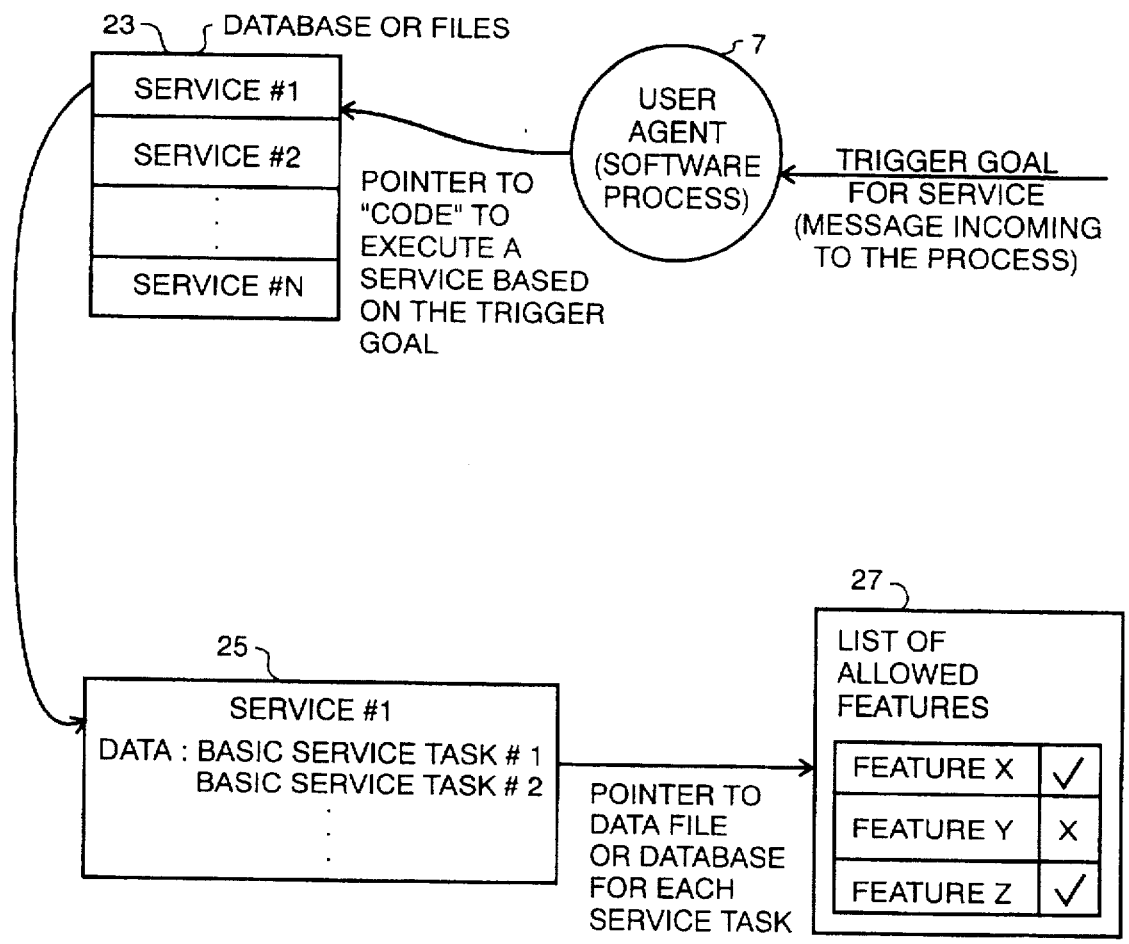

FIG. 5 illustrates an embodiment of the process of the invention in more detail. As described with reference to FIG. 4, a goal is input to a user agent 7. The goal appears as a message to trigger a process (program) to be invoked by the user agent 7.

The user agent, in response produces a pointer to the program code stored in memory 2 which executes the service based on the trigger goal. For example the program code for a plurality of services, i.e. service #1, service #2, ... service #n is stored in a database 23 or in equivalent files, in memory 2. Thus when a goal is received by the user agent, it points to a particular program stored in database 23 or elsewhere in memory 2.

The particular program, e.g. service #1, pointed to in database 23 is comprised of a list of service tasks 25, for example basic service task #1, basic service task #2, etc. Each service task points to a list 27 of allowed features, such as feature x, feature y, feature z, etc. The feature list can be a list of all possible features, with an indication of which are allowed and which are not allowed for the processing of a particular task.

For example, one of the tasks can be to call a ringing signal generator from the resources 5. The list of allowed features could allow or disallow special ringing cadences.

For an incoming call, for example a voicemail message, the goal which is input to the called party's user agent can be determined from the context of the incoming call, as described earlier. The goal, which is input from the processor in a manner as described in the aforenoted CATA patent application, can be different depending on which role the called party is assuming, as described above. Thus the user agent points to different services in the database 23 depending on the role based nature of the trigger goal.

With different services extended to the user depending on his role, the particular basic service tasks undertaken from the list 25 are unique to the particular role of the called party, and the list of allowed features pointed to by the tasks in the service list 25 also are unique for each particular service task.

For example, the basic service task #1 could be to invoke ringing as described above. The feature list could restrict special cadence ringing. However basic service task #2 could also be to invoke ringing as described above, but the feature list for basic service task #2 could be to allow special cadence ringing. Thus the particular trigger goal which is received by user agent 7, which is role dependent, would cause user agent 7 to point to either service #1 or #2 to invoke ringing, dependent on the allocated service to the particular role of the called party.

It will be understood that while incoming calls have been described, the invention is equally applicable to subscribers making outgoing calls. In such cases, the user agent of the calling party determines either from dialed digits, other signals which are input by the user, or from context analysis of the signals input by the user, what is the role of the user. As a result, features can be provided or restricted from the user.

A person understanding this invention may now conceive of alternative structures and embodiments or variations of the above. All of those which fall within the scope of the claims appended hereto are considered to be part of the present invention.

We claim:

1. A method of providing communication service to a plurality of subscribers comprising:
   (a) allocating various services to be provided to said subscribers to roles to be filled by said subscribers,
   (b) receiving a trigger for a service to be provided to a subscriber in a particular role, and
   (c) providing different system resources to said subscriber to enable the subscriber to utilize the triggered service, which system resources are restricted to those services which are allocated to said particular role.

2. A method as defined in claim 1 in which the subscriber has more than one role, including designating which role the subscriber is fulfilling for the receipt of the trigger based on a service requested by a calling party, and providing said services to said calling party restricted to those services allocated to the role that the subscriber is fulfilling.

3. A method as defined in claim 2 including designating which role the subscriber is fulfilling by a software user agent.

4. A method as defined in claim 2 in which the system resources providing step includes pointing to a service in a list of services stored in a database, the service pointed to depending on which particular role is allocated to the subscriber, acquiring a basic service task associated with the pointed to service, pointing to a list of allowed system resources from each basic service task, and completing the service by software programs corresponding to each basic service task with an associated group of allowed system resources, which correspond to the service pointed to in the list of services.

5. A method as defined in claim 4 in which the service in the list of services is pointed to by a software program user agent which receives a trigger goal indicating that a call is to be completed to a particular called subscriber in a particular role.

6. A method as defined in claim 4 in which a service stored in the database is a telephone service.

7. A method as defined in claim 1 in which the subscriber has more than one role, including designating which role the subscriber is fulfilling for the receipt of the trigger based on role-indicating data temporarily stored in a database by the subscriber.

8. A method as defined in claim 1 including analyzing call request data input to a software user agent and determining said role based on context of said data input.

9. A method as defined in claim 8 in which the input data is input to said software user agent as a result of the receipt of a trigger.

10. A method as defined in claim 8 in which the input data is input to the software user agent as a result of the initiation of an outgoing trigger from a call requesting device.

11. A method as defined in claim 1 in which a service provided to a subscriber is a telephone service.

12. A method of providing telephone service to a plurality of subscribers comprising:
   (a) allocating various telephone services to roles to be filled by said subscribers,
   (b) receiving a telephone call to a directory number associated with a subscriber in a particular role, and
   (c) providing telephone services to a telephone set associated with the directory number for the telephone call, which are restricted to those services which are allocated to said particular role.

* * * * *